United States Patent [19]
Whitt

[11] Patent Number: 6,023,681
[45] Date of Patent: Feb. 8, 2000

[54] METHOD AND APPARATUS FOR PREDICTING QUEUING DELAYS

[75] Inventor: Ward Whitt, Basking Ridge, N.J.

[73] Assignee: AT&T Corp., Middletown, N.J.

[21] Appl. No.: 08/908,042

[22] Filed: Aug. 11, 1997

[51] Int. Cl.[7] .................................................. G06F 17/00
[52] U.S. Cl. ........................... 705/8; 705/9; 395/200.32; 395/200.57
[58] Field of Search ....................... 705/8, 9; 395/200.32, 395/200.57

[56] References Cited

U.S. PATENT DOCUMENTS 4,788,715  11/1988  Lee .
5,749,074   5/1998  Kasso et al. .................................. 705/8

Primary Examiner—Thomas R. Peeso

[57] ABSTRACT

Apparatus and method for predicting wait times for queuing customers. Upon arrival of a new customer to the queue, or at any other desired time, a system classifies each customer in service according to one or more attributes. The system generates a probability distribution of the remaining service time for each customer based on the attributes. Preferably, the system classifies each customer in queue according to one or more attributes and generates a probability distribution of service time based on the attributes. From the probability distributions of the customers in service and the customers in queue, the system estimates a wait time for the new customer. The estimated wait time may be communicated to the customers or to a system administrator and may include information on the full waiting time distribution or a summary of the distribution.

43 Claims, 3 Drawing Sheets

METHOD AND APPARATUS FOR PREDICTING QUEUING DELAYS

BACKGROUND OF THE INVENTION

The present invention is directed to a method and apparatus that estimates delays to be endured by customers to a queue.

In service systems having a limited capacity, it is known to place customers who cannot be served immediately into a queue until system resources become available to the customer. Often, customers are not given an estimate of the time when the customer can begin to receive service. If the customers are forced to wait "on hold" for a long period of time without such information, the customer may become dissatisfied with the service provider.

To provide customers with information regarding a time in which the customer can expect to wait in queue, some service providers may identify the customer's position in queue. However, position information may not enable the customer to determine how long the customer will have to wait before obtaining service. The customer cannot determine how many agents are fielding service requests or the rate at which the agents are completing service requests.

Other service providers may generate an estimate of the rate at which its agents complete service requests from its customers. A system having s agents each of whom, on average, complete service requests in r minutes, may predict that a customer placed in queue at the kth position will be served in $k*r/s$ minutes. However, prediction based on such long-run averages may be subject to gross inaccuracies in specific instances. If long-term averages are not met in specific instances, customers may wait for a much longer time than is predicted. Such customers, too, may become dissatisfied with the service provider.

Accurate prediction could also serve other purposes. For instance, a service provider might provide additional service at some other facility after the first service is complete. The predicted delay at the first facility might enable the service provider to better plan for the subsequent service. The service provider also might use the delay predictions to budget its available service capacity, e.g., by adding agents when large delays are predicted.

For the reasons set forth above, there is a need in the art for a system that accurately predicts anticipated wait times that customers will incur upon entering a queue.

SUMMARY OF THE INVENTION

The disadvantages of the prior art are alleviated to a great extent by an apparatus and method that classifies each waiting customer and each customer being serviced based upon known attributes of the customers and possibly upon the agents that are providing the service. Based upon the classifications, the system estimates the probability distribution function of each customer's remaining service time. The system calculates, from the estimated probability distribution functions of the service times, an estimated number of departures that are expected over time and further calculates a full probability distribution function of the expected waiting time before a new customer can begin service. The system may also calculate a full probability distribution of the waiting time before beginning service for other customers that already have been waiting (those in queue).

The present invention may use one of four different methods to predict a distribution of the estimated waiting time for a new customer. First, the estimated waiting time distribution may be based on the probability distribution functions of the service times for the customers in service and the customers in queue. Second, an added refinement may be used to estimate starting times for the customers in queue ahead of the new customers. Third, when the number of agents is greater than the number of customers, the estimated waiting time may be estimated based on the rate of service of the agents. Fourth, when the number of agents is less than the number of customers in queue, the estimated waiting time may be estimated based on the service-time distributions of the customers in queue.

DETAILED DESCRIPTION

The present invention provides improved service in a service system having a limited capacity by estimating a probability distribution function of the waiting time before a new customer (or a customer already in queue) will begin to receive service. This probability distribution can be used by the service provider to provide approximate wait time estimates to customers. The service provider could communicate to the customers the full estimated probability distribution function of the wait time or, alternatively, communicate only summary descriptions of the probability distribution function, such as the expected value or the 90th percentile. The service provider could also give some idea of the uncertainty of an expected estimate value, e.g. by giving the variance. Finally, the service provider may use the estimate to reconfigure the system and add or remove agents to change the wait time estimates.

All customers, those receiving service and those waiting in queue, are categorized by one or more customer attributes. From those customer attributes, a probability distribution function ("PDF") of the remaining service time is generated for each customer. These service-time PDFs permit a system administrator to predict a waiting time PDF for a new customer being added to the queue. It also permits a system administrator to predict the waiting time PDF of any customer already in the queue.

The "probability distribution function" of a random quantity is a description of the probability that the quantity is less than or equal to any specified value, for all possible values. If X is a random time, then its probability distribution function can be denoted by $G(x)=P(X \leq x)$, $0 \leq x < \infty$, i.e., the probability that X is less than or equal to x for each possible x.

Figure 1:
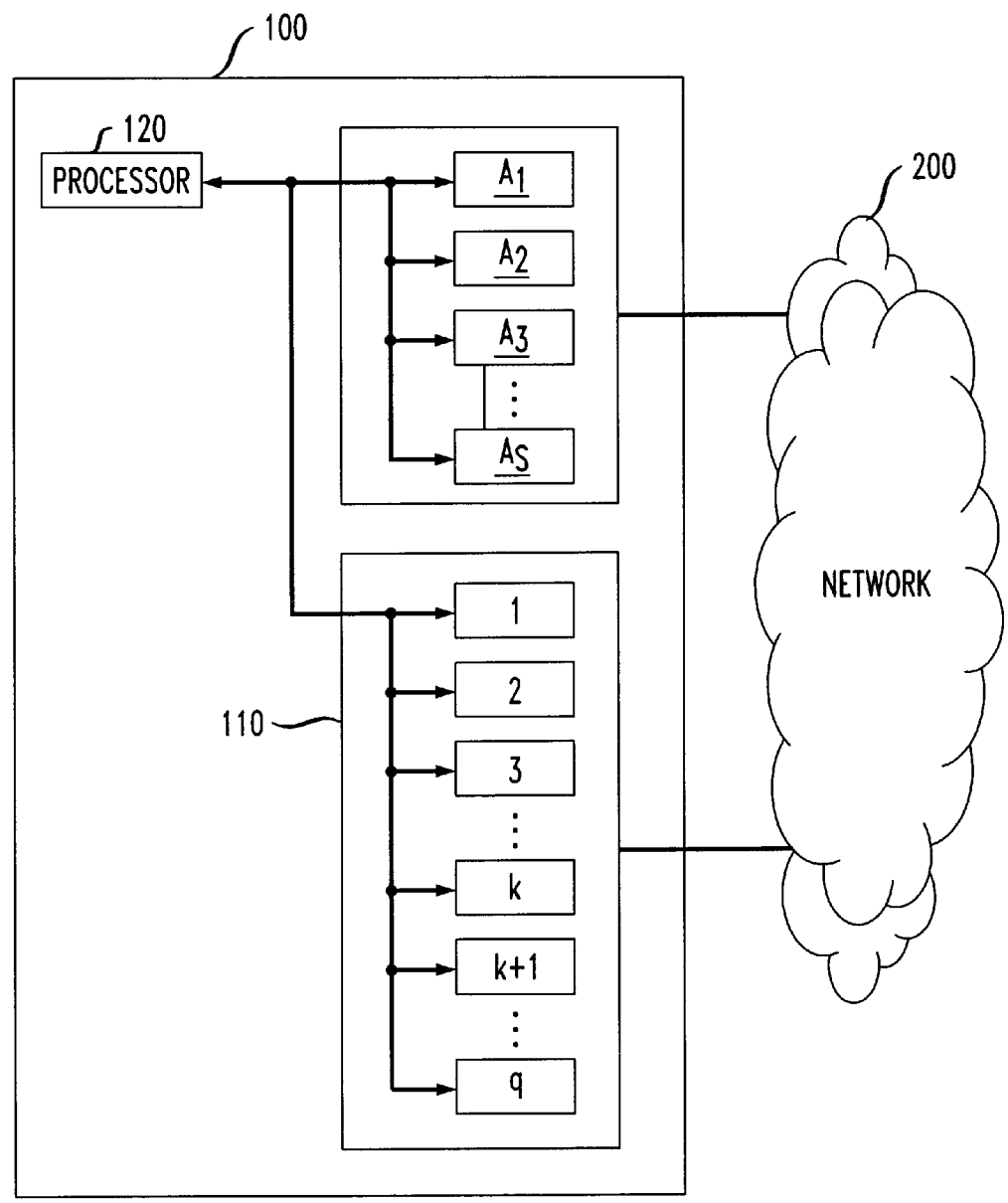
FIG. 1 is an illustration of a system constructed in accordance with the present invention.

FIG. 1(a) shows an embodiment of a system 100 constructed in accordance with the present invention. The system 100 includes a plurality of agents $A_1$–$A_s$ having capacity s and a queue 110 having capacity q. The agents $A_1$–$A_s$, and the queue 110 are in communication with a plurality of customers (not shown) via a network 200. In a preferred embodiment, the system 100 includes a processor 120 in communication with each of the agents $A_1-A_s$ and with the queue. The processor 120 monitors the activity of the agents $A_1-A_s$, and, accordingly, monitors the service requirements of the customers for whom each agent is providing service. The processor also monitors the queue 110 and, accordingly, monitors all activity between the queue 110 and the customers placed therein.

When all agents are serving customers, any new customers are placed in the queue 110. New customers are dropped when the queue 110 is full. If the system 100 is serving s customers and k customers are in queue, the new customer is placed in queue 110 at position k+1. Upon arrival, the system 100 provides new customers with an estimate of the wait time that the customer will endure. At any other desired time, the system also can provide customers already in queue with estimates of remaining wait-times they will endure.

Figure 2:
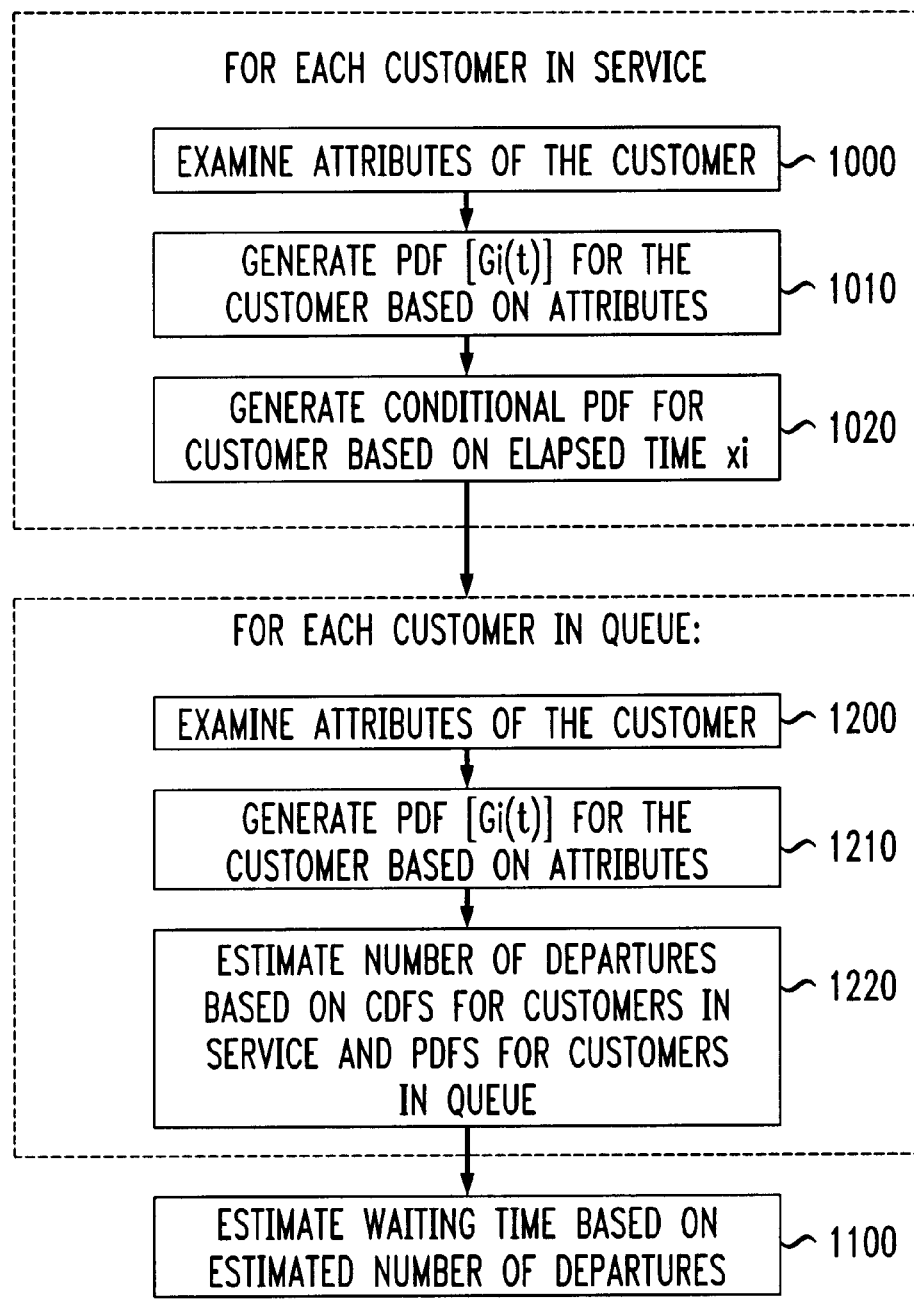
FIG. 2 is an illustration of a method of the present invention.

The prediction method of the present invention is shown in FIG. 2. Upon arrival of a new customer or at any desired time, the system 100 examines attributes of each customer in service (Step 1000). The system generates probability distribution functions, labeled $G_i(t)$, for the remaining service-time of each customer i based on the attributes found (Step 1010). The system also considers the customers in queue ahead of the new customer. As with the customers in service, the system examines attributes of the customers in queue (Step 1010). Based on the customer attributes, the system generates service-time PDFs $G_i(t)$ for each queuing customer i representing the probability that the customer's service will be less than or equal to any specified time (Step 1030). Finally, the system estimates a PDF of the waiting time before beginning service based upon the estimated number of departures (Step 1100).

Figure 3A:
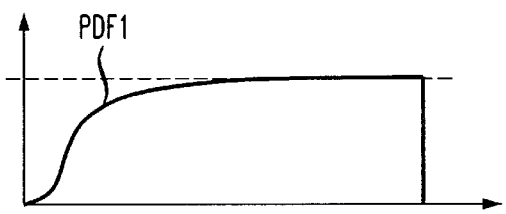
FIGS. 3(a), 3(b) and 3(c) illustrate probability distribution functions applicable to the present invention.
Figure 3B:
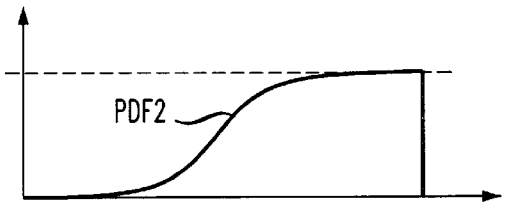
Figure 3D:
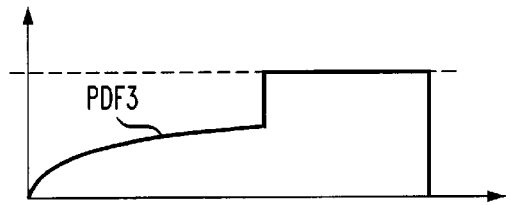

To establish service-time PDFs for the customers, the system 100 examines a number of attributes for each customer As an illustrative example, the system 100 may be one for providing internet connection services. Each of the s customers in service might be classified according to the activity that the customer initiates upon connection. FIG. 3 illustrates a variety of probability distribution functions that may be appropriate to the classifications. Customers that connect to retrieve electronic mail, for example, may disconnect very soon after connection; PDF1 may be appropriate for these customers, shown in FIG. 3 (a). Other customers may exhibit behavior that demonstrates a longer connection time, in which case PDF2 would be appropriate, shown in FIG. 3(b) Still other PDFs may be assigned to other customers or based on other attributes. As another attribute, the relative efficiency of one agent $A_1$ may be considered when generating PDFs. Further, policies of the service providers may affect distributions. For example, a help desk may choose to limit service requests to a set amount of time, say 10 minutes; if a customer's problem is not solved before the limit expires, the customer may be referred to some other service provider. Such a policy could be represented by PDF3 in FIG. 3(c). Each customer i in service is assigned a service-time PDF $G_i(t)$ representing the probability that the customer will disconnect on or before time t.

Figure 4A:
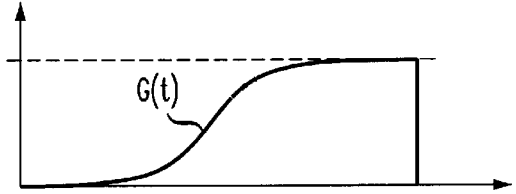
FIG. 4(a) illustrates the probability distribution function of FIG. 3(b)
Figure 4B:
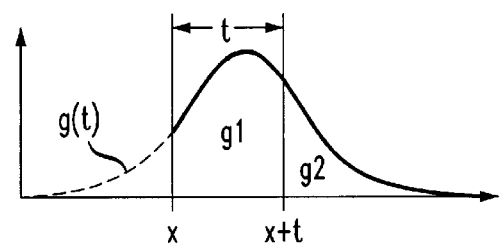
FIG. 4(b) illustrates a conditional probability density function related to the probability distribution function of FIG. 4(a).

One attribute that is particularly useful when generating PDFs of the remaining service time of customers in service is the elapsed time of service. Given that the customer has been in service an amount of time x, the system estimates probabilities that the customer will terminate service before time t, for all t values. The estimate is called a "conditional PDF." FIGS. 4(a) and 4(b) illustrate a relationship between the PDF and probability density functions. If g(t) is the probability density function associated with probability distribution function G(t), they are related by:

$$G(t) = \int_0^t g(u) du; \tag{1}$$

i.e., G(t) is the integral of g from 0 to t and g(t) is the derivative of G(t) at t. FIG. 4(b) displays a hypothetical probability density function $g_i(t)$. A conditional probability distribution function $G_i(t|x)$ is represented by the g1 area divided by the total area (g1 and g2).

The total area under the curve $g_i(t)$ is assumed to be 1. Because it represents a probability, the system 100 calculates a conditional PDF, $G_i(t|x_i)$, representing the probability that, given that the customer service has lasted a time $x_i$, the customer service will conclude within an additional time t:

$$G_i(t | x_i) = \frac{G_i(t + x_i) - G_i(x_i)}{1 - G_i(x_i)} \tag{2}$$

Even if the elapsed times of the customers in service are not available, the knowledge that a customer already is in service may be exploited. Then, instead of the original service-time PDF, an alternative service-time stationary-excess conditional PDF $$G_i(t) = \frac{1}{m_i} \int_0^t [1 - G_i(u)] du, t \geq 0 \tag{3}$$

can be used; where $m_i$ is the mean (expected value) of the PDF $G_i$.

In addition to the customers in service, the system 100 generates PDFs for the k customers in queue by classifying the customers by whatever attributes are known about them. Using the internet connection example above, because the queuing customers have not received internet services, the system cannot classify them based upon their conduct. However, the system 100 may possess other information, such as the customers' IDs or telephone numbers, that permit limited classifications to be made. If the customer's IDs are known, the system may assign PDFs based on the customers' prior behavior. As noted, the system 100 may have established policies, independent of any customer attribute, that governs the PDF. A PDF $G_j(t)$ is assigned to each customer in queue (1<j<k) representing a probability over time when the customer will conclude service.

For certain customers, either those in service or those in queue, only partial information may be available regarding the customer's estimated service time. For example, a mean service time, $m_i$, may be available. When only partial information is available, the system fits a service time PDF $G_i(t)$ to the partial information, For example, given the mean $m_i$, the system can fit an exponential PDF $G_i(t)=1-e^{-t/m_i}$. For some customers, the mean $m_i$ may have to be a long-run average.

Once service-time PDF's are generated for the customers in service and the customers in queue, the system 100 sums across all customers in service to estimate the expected number of departures in the time interval [0, t] from the customers initially in service, $ED_s(t)$:

$$ED_s(t) \approx \sum_{i=1}^{s} G_i(t) \qquad (4)$$

Assuming, as a practical approximation, that the customers in queue can start service immediately, the expected number of departures over time for the first k customers in queue, $ED_q(t)$, can be approximately expressed as:

$$ED_q(t) \approx \sum_{i=s+1}^{s+k} G_i(t) \qquad (5)$$

An associated estimate of the total expected number of departures can be obtained by adding Eqs. (4) and (5), i.e:

$$ED(t) = ED_s(t) + ED_q(t). \qquad (6)$$

Armed with an estimated number of departures over time, the system may estimate the time before the system will service k+1 customers, which is the time when the new customer can begin to receive service. The same formula applies to a customer already in queue if he is the $(k+1)^{th}$ customer. The actual random waiting time W is:

$$W = \min\{t \geq 0 : ED(t) = k+1\} \qquad (7)$$

The next step is to develop an approximate expression for the PDF of the waiting time W, i.e., for $P(W \leq w)$ as a function of w. Because the random number D(t) is a sum of independent random variables, its distribution is assumed to be approximately normally distributed. Let $w_x$ be defined to represent a waiting time based on the mean ED(t) and the standard deviation SD(D(t)):

$$w_x = \min\{t \geq 0 : ED(t) + xSD(D(t)) = k+1\} \qquad (8)$$

where x is a constant. Then the system may obtain an approximate expression for the distribution of W by:

$$P(W > w_x) \approx P(D(t) \leq ED(t) + xSD(D(t))) \approx P(N(0,1) \leq x) \approx \Phi(x), \qquad (9)$$

where N(0,1) is a standard normal random variable having mean 0 and variance 1 and $\Phi$ is its PDF. As x is allowed to vary, Eqs. (8) and (9) give an expression for the complementary PDF of W, i.e., for 1−P(W<w) as a function of w.

In many applications, it is useful to obtain the full distribution of W. In such applications, the system calculates the distribution according to Eq. (9) above. However, in other applications, only a single value of a wait time is necessary. In this circumstance, the system progresses as follows.

For $0<\alpha<1$, a relationship is defined $x_\alpha = \Phi^{-1}(\alpha)$ (or, equivalently, $\Phi(x) = \alpha$). Then $W_{x_\alpha}$ is the approximate $\alpha^{th}$ percentile of the distribution of w.

The system can also generate a single value summary estimate of the PDF of the waiting time W. The relationship between $\alpha$ and w allows a system operator to choose how aggressive or conservative his estimate will be. For example, setting $\alpha=0.90$, the system operator obtains an estimate of w that has a 90% probability [$\alpha$*100%] of being less than or equal to the estimates. Alternatively, setting $\alpha=0.5$ obtains an estimate that has a 50% chance of being less than or equal to the estimates (i.e., the median).

In a second embodiment of the present invention, a better estimate of wait times is obtained by estimating the times at which each customer in queue ahead of the new customers will be able to begin service. The system 100 estimates times of departure of the customers now in service based on their PDFs. The system 100 then uses each estimated departure time as a starting point of the PDFs of the customers in queue. The system 100 estimates a time, $t_j$, in which the $j^{th}$ customer in queue will begin service:

$$t_j = \min\{t \geq 0 : ED_s(t) = j\} \qquad (10)$$

where $ED_s(t)$ is given in Eq. (4) From the $t_j$'s, the system 100 obtains an estimate of the expected number of departures over time:

$$ED(t) \approx \sum_{i=1}^{s} G_i(t|x_i) + \sum_{j=1}^{k} G_i(t - t_j) \qquad (11)$$

Having obtained a more precise estimate of the number of departures over time, the system may estimate the waiting time of the new customers according to W in the first embodiment (Eq. (7)–(9)) but using ED(t) in Eq. (11) above as the basis of the estimate.

In a third embodiment, the system calculates waiting times for the first few customers in queue. The third embodiment is particularly useful when the number of customers in queue is small relative to the number of agents (i.e., k<<s). The system estimates the instantaneous rate of departure of customers in service and extends that rate over the first few customers in queue. The waiting time of the first customer in the queue has the complementary PDF:

$$P(W_1 > t) = \prod_{i=1}^{s} (1 - G_i(t)) \qquad (12)$$

which may be calculated via:

$$\log P(W_1 > t) = \sum_{i=1}^{s} \log(1 - G_i(t)). \qquad (13)$$

The service-time PDF $G_i(t)$ in Eqs. (12) and (13) is assumed to be based on the customer and agent attributes, just as before. Furthermore, $W_1$ may be approximated by an exponential distribution:

$$P(W_1 > t) \approx e^{-\mu_1 t}, t > 0 \text{ where } \mu_1 \approx \frac{\log P(W_1 > t_0)}{t_0} \qquad (14)$$

Then, the departure process can be approximated by a Poisson process with rate $\mu_1$ so that $W_k$ has approximately a gamma distribution with mean and variance:

$$EW_k = \frac{k}{\mu_1} \text{ and } VarW_k = \frac{k}{\mu_1^2}. \qquad (15)$$

This approximation is natural to use when only the mean remaining service times of the customers in service is known ($m_i$, $1 \leq i \leq s$). Then the rate $\mu_1$ may be approximately expressed as $$\mu_1 = \sum_{i=1}^{s}\left(\frac{1}{m_i}\right). \quad (16)$$

In a fourth embodiment, the system 100 tends to de-emphasize the role of the customers in service. Such a prediction scheme finds application where the number of customers in queue is large compared with the number of agents (i.e. k>>s). In this embodiment, the estimated. waiting time resembles the k/s*r estimate described in the background of the invention above. However, the present invention advantageously considers the nonidentically distributed PDFs $G_i(t)$ of the customers, and the means $m_i$ and variances $\sigma_i^2$ of the PDFs:

$$EW \approx \frac{1}{s}\sum_{i=1}^{k+1} m_i, \text{ and } \text{Var}W \approx \frac{1}{s^2}\sum_{i=1}^{k+1}\sigma_i^2. \quad (17)$$

The s customers in service are indexed first, followed by the first customers in queue.

The present invention has been characterized as a method for predicting a wait time that a customer, either in queue or new to a queue, will endure before being able to begin receiving service The present invention also finds application as a method and apparatus for predicting an estimated waiting-time before the customer will end service. In this embodiment, the system considers the service-time PDF of the customer himself, in addition to those customers already in service and those in queue ahead of the customer. If $T_i$ is the total time for customer i to complete service, then its PDF can be obtained from the two component PDF's by a convolution integral:

$$P(T_i \le x) = \int_0^x G_i(x-u) d P(W_i = u). \quad (18)$$

The expected values are related simply by:

$$ET_i = EW_i + m_i, \quad (19)$$

where $m_i$ is the expected value of the service-time PDF $G_i$.

The present invention described above generates a more precise and reliable estimate of queuing delays to be experienced by customers in a queue by estimating service times of customers in service and perhaps customers in queue based upon attributes known for each customer. From the estimated service times, a prediction of a waiting time for a certain customer may be made. The prediction also provides benefits to queue administrators who may allocate additional or fewer agents to meet changing demand.

I claim:

1. A method of predicting a waiting time for a customer in a queue, comprising the steps of:
    for each of a number of customers in service and ahead of the customer:
        classifying the customer in service according to an attribute known for the customer in service, and generating, based on the attribute of the customer in service, an estimate for the customer representing a time that the customer will terminate service;
    for each of a number of customers ahead of the customer in queue:
        classifying the customer ahead in queue according to an attribute known for the customer ahead in queue, and generating, based on the attribute of the customer ahead in queue, an estimate for the customer ahead in queue representing a time that the customer ahead in queue will terminate service; and
    predicting, based on the estimates generated for the customer in service and ahead in queue, an estimated waiting time for the customer in queue representing a time that the customer in queue will wait before service.

2. The method of claim 1, wherein the estimate of the first generating step for at least one customer in service is a probability over time that the customer will terminate service by that time.

3. The method of claim 1, wherein an estimate of the second generating step for at least one customer ahead in queue is a probability over time that the customer ahead in queue will terminate service by that time.

4. The method of claim 1, wherein the estimate generated for at least one customer in service is a probability distribution function.

5. The method of claim 4, wherein the probability distribution function of the at least one customer in service is based on an estimated mean time of service for the customer.

6. The method of claim 1, wherein the estimate generated for at least one customer ahead in queue is a probability distribution function.

7. The method of claim 6, wherein the probability distribution function of the at least one customer ahead in queue is based on an estimated mean time of service for the customer.

8. The method of claim 1, wherein the customer in queue is new to the queue.

9. The method of claim 1, wherein the attribute known for at least one customer in service is the time elapsed for the one customer since the one customer first began to receive service.

10. The method of claim 7, wherein the estimate generated for the one customer is a conditional probability distribution function representing a probability over time when the one customer will terminate service given the elapsed time for the one customer.

11. The method of claim 1, wherein the attribute known for at least one customer in service is the identity of an agent serving the one customer.

12. The method of claim 1, wherein the attribute known for at least one customer in service is an upper limit service time for the one customer.

13. The method of claim 1, wherein the attribute known for at least one customer in queue is an upper limit service time for the one customer.

14. The method of claim 1, wherein the attribute known for at least one customer in service is an identifier of the one customer.

15. The method of claim 1, wherein the attribute known for at least one customer in queue is an identifier of the one customer.

16. The method of claim 1, wherein the attribute known for at least one customer in service is conduct of the one customer.

17. The method of claim 1, wherein the estimated waiting time is the time before beginning service.

18. The method of claim 1, wherein the estimated waiting time is a time before concluding service.

19. The method of claim 1, wherein the generating step includes a step of predicting a time when the customer in queue will begin to receive service.

20. The method of claim 1, wherein the estimate generated for at least one customer in queue is based on the predicted time when the one customer will begin to receive service.

21. The method of claim 1, wherein the predicted waiting time is an estimated probability distribution function.

22. The method claim 21, further comprising a step of communicating the estimated probability distribution function to the new customer.

23. The method of claim 21, further comprising a step of communicating a predetermined approximation of the estimated probability distribution function to the new customer.

24. The method of claim 21, further comprising a step of communicating the estimated probability distribution function to a system administrator.

25. The method of claim 21, further comprising a step of budgeting resources based on the estimated probability distribution function.

26. The method of claim 1, further comprising a step of communicating the estimated waiting time to the customer in queue.

27. A method of predicting a wait time for a customer in queue to receive service from a system, comprising the steps of:
   classifying each of a plurality of customers in service according to an attribute known for the customer in service,
   generating for each customer in service, based on the attribute known for the customer in service, a probability distribution function for the customer representing a probability over time that the customer will terminate service;
   predicting, based on the probability distribution functions of the customers in service, a rate of service for the system, and
   predicting a wait time for the customer in queue based on the rate of service.

28. The method of claim 27, wherein a number of customers in service exceeds a number of customers in queue.

29. The method of claim 27, wherein the customer in queue is first in queue.

30. The method of claim 27, wherein the probability distribution function of at least one customer in service is based upon a mean of a remaining service time of the respective customer.

31. A method of predicting a wait time for a customer new to a queue, comprising the steps of:
   classifying each of a plurality of customers in queue according to an attribute known for the customer in queue,
   generating, based on the attribute of the customer in queue, a mean approximating a probability distribution over time that the customer will terminate service, and
   predicting, based on the means for each customer in queue, an estimated waiting time for the new customer.

32. The method of claim 31, wherein each customer in queue will not receive service until one of a plurality of customers in service terminate service, and
   a number of customers in queue is much greater than a number of customers in service.

33. In a system comprising a plurality of agents and a queue, an apparatus for predicting a wait time for a customer in the queue, comprising:
   a processor in communication with each of the agents for monitoring activity of customers in communication with the agents, said processor also in communication with the queue, wherein for each of the agents, the processor generates a probability function representing a probability over time when the customer in communication with the agent will conclude service, wherein the processor further estimates a wait time based on the probability functions, and
   communication means for communicating the estimated wait time to the new customers.

34. The system of claim 33, wherein the processor generates the probability function based on monitored activity of the customer in service.

35. The system of claim 33, wherein the processor estimates a probability distribution of the wait time.

36. The system of claim 35, wherein the processor estimates a mean wait time.

37. The system of claim 35, wherein the processor estimates a predetermined percentile of the wait time.

38. In a system comprising a plurality of agents and a queue, an apparatus for predicting a wait time for a certain customer in queue, comprising:
   a processor in communication with each of the agents for monitoring activity of customers in communication with the agents, said processor also in communication with the queue,
   wherein, for each of the agents, the processor generates a first probability function representing a probability over time when the agent will conclude service,
   wherein, for each of a plurality of customers in queue, the processor generates a second probability function representing a probability over time when the queuing customer will conclude service;
   wherein the processor estimates a wait time based on the probability functions, and
   a communicator that communicates the estimated wait time to the certain customer in queue.

39. The apparatus of claim 38, wherein upon arrival of the certain customer, the processor estimates a wait time for each customer ahead in queue and the communication means communicates the wait times to the respective customer ahead in queue.

40. A method of predicting a wait time for a certain customer in a queue, comprising steps of:
   for each of a plurality of customers in service and in queue:
      classifying the customer based on at least one attribute of the customer, and
      based upon the at least one attribute, generating a probability distribution function representing a probability over time when the customer will conclude service; and
   estimating a wait time for the certain customer based on the probability distribution functions for the customers in service and in queue.

41. A method of predicting a wait time for a first customer in queue, comprising steps of:
   for each of a plurality of customers in service:
      classifying the customer based on at least one attribute, and
      based on the attributes, generating an estimated service time when the customer in service will conclude service; and
   estimating a wait time for the first customer based on the estimated service time.

42. A method of predicting a wait time for a customer in a queue when a number of customers in queue greatly exceeds a number of customers in service, the method comprising steps of:
   classifying each customer in queue ahead of the customer in queue based on at least one attribute, for each customer ahead in queue, generating an estimated time before the respective customer will complete service, based on the attribute of classification, and, complete service, based on the attribute of classification, and, predicting a wait time for the customer in queue based on the estimates generated for the customers ahead in queue.

43. A method of allocating a number of agents in a service system, the system including a plurality of agents and a queue comprising the method steps of:

monitoring the agents, each agent serving a customer, to estimate a time when the agent will conclude service of its customer, for each of a plurality of customers in the queue, classify the customer in queue based on at least one attribute, generating an estimated service time for the customer in queue based on the classification, predicting an estimated wait time before the last customer in queue will wait before receiving service based on the estimated service times, determining when the estimated wait time exceeds a predetermined wait time, and when the estimated wait time exceeds the predetermined wait time, increasing the number of agents.

* * * * *